United States Patent
Faibish et al.

(10) Patent No.: US 10,049,122 B1
(45) Date of Patent: Aug. 14, 2018

(54) CLUSTER FILE SYSTEM COMPRISING MULTIPLE BURST BUFFERS EACH INCLUDING VIRTUAL FILE SYSTEM AND METADATA SERVER COMPONENTS

(71) Applicant: EMC Corporation, Hopkinton, MA (US)

(72) Inventors: Sorin Faibish, Newton, MA (US); John M. Bent, Los Alamos, NM (US); Jingwang Zhang, Beijing (CN); Haiyun Bao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 670 days.

(21) Appl. No.: 14/315,957

(22) Filed: Jun. 26, 2014

(51) Int. Cl.
G06F 17/30 (2006.01)
G06F 7/00 (2006.01)

(52) U.S. Cl.
CPC .. *G06F 17/30224* (2013.01); *G06F 17/30233* (2013.01)

(58) Field of Classification Search
None
See application file for complete search history.

(56) References Cited

U.S. PATENT DOCUMENTS

| | | | | |
|---|---|---|---|---|
| 5,043,876 A * | 8/1991 | Terry | | G06F 17/30168 707/649 |
| 5,960,446 A * | 9/1999 | Schmuck | | G06F 17/30224 707/610 |
| 6,029,168 A * | 2/2000 | Frey | | G06F 17/30067 |
| 9,317,325 B2 * | 4/2016 | McGrath | | G06F 9/485 |
| 9,477,551 B1 * | 10/2016 | Piszczek | | G06F 11/1076 |
| 2008/0109575 A1 * | 5/2008 | Dries | | G06F 13/385 710/30 |
| 2013/0159364 A1 | 6/2013 | Grider et al. | | |

(Continued)

OTHER PUBLICATIONS

Marc Eshel; Panache: A Parallel File System Cache for Global File Access; 2011; pp. 1-14.*

(Continued)

*Primary Examiner* — Mariela Reyes
*Assistant Examiner* — Jermaine Mincey
(74) *Attorney, Agent, or Firm* — Ryan, Mason & Lewis, LLP

(57) ABSTRACT

A cluster file system comprises a parallel file system and a plurality of burst buffers, with the burst buffers collectively configured to provide an interface between the parallel file system and compute nodes of a computer system. Each of the burst buffers comprises a virtual file system component and a metadata server component. The virtual file system components of respective ones of the burst buffers collectively implement a virtual file system. Metadata relating portions of the virtual file system to portions of the parallel file system is stored in a distributed manner over the metadata server components of the respective burst buffers. Each burst buffer independently manages its own flash memory, but the burst buffers are configured such that data consistency is ensured across their flash memories. The virtual file system illustratively comprises a parallel log-structured file system (PLFS) and the metadata server components illustratively comprise respective IO forwarding servers.

20 Claims, 10 Drawing Sheets

(56) References Cited

U.S. PATENT DOCUMENTS

2015/0134780 A1* 5/2015 Weber ............... G06F 17/30091
709/219

OTHER PUBLICATIONS

G. Grider et al., "Parallel Log Structured File System (PLFS)," Los Alamos National Laboratory Associate Directorate for Theory, Simulation, and Computation (ADTSC), Technical Report LA-UR 13-20839, pp. 82-83.

J. Bent et al., "PLFS: A Checkpoint Filesystem for Parallel Applications," Proceedings of the Conference on High Performance Computing Networking, Storage and Analysis, Article No. 21, Nov. 2009, 12 pages.

J. Bent et al., "U.S. Department of Energy Best Practices Workshop on File Systems & Archives: Usability at Los Alamos National Lab," Los Alamos National Lab (LANL), Technical Report LA-UR 11-11416, Sep. 2011, 5 pages.

K. Mehta et al., "A Plugin for HDF5 Using PLFS for Improved I/O Performance and Semantic Analysis," SC Companion: High Performance Computing, Networking, Storage and Analysis (SCC), Nov. 2012, pp. 746-752.

Rob Ross, "High Performance Computing I/O Systems: Overview and Recent Developments," Argonne National Laboratory, 53 pages.

M. Polte et al., ". . . And Eat it too: High Read Performance in Write-Optimized HPC I/O Middleware File Formats," 4th Annual Workshop on Petascale Data Storage (PDSW), Nov. 2009, pp. 21-25.

J. He et al., "I/O Acceleration with Pattern Detection," 22nd International Symposium on High-Performance Parallel and Distributed Computing (HPDC), Jun. 2013, pp. 25-36.

J. Bent et al., "Jitter-Free Co-Processing on a Prototype Exascale Storage Stack," IEEE 28th Symposium on Mass Storage Systems and Technologies (MSST), Apr. 2012, pp. 1-5.

S.A. Wright et al., "LDPLFS: Improving I/O Performance Without Application Modification," IEEE 26th International Parallel and Distributed Processing Symposium Workshops & PhD Forum (IPDPSW), May 2012, pp. 1352-1359.

C. Cranor et al., "Structuring PLFS for Extensibility," 8th Parallel Data Storage Workshop (PDSW), Nov. 2013, pp. 20-26.

Carlos Maltzahn, "Scientific Data Management on Exa-Scale Systems: 2020 Vision?," Trends in High Performance Distributed Computing, Vrije Universiteit, Mar. 2012, 9 pages.

A. Manzanares et al., "Reducing Concurrency in Parallel File Systems," Los Alamos National Laboratory (LANL), Technical Report LA-UR-11-10426, Nov. 2012, 9 pages.

N. Ali et al., "Scalable I/O Forwarding Framework for High-Performance Computing Systems," IEEE International Conference on Cluster Computing and Workshops (CLUSTER), Aug. 2009, pp. 1-10.

J. Bent et al., "Storage Challenges at Los Alamos National Lab," IEEE 28th Symposium on Mass Storage Systems and Technologies (MSST), Apr. 2012, pp. 1-5.

A. Manzanares et al., "The Power and Challenges of Transformative I/O," IEEE International Conference on Cluster Computing (CLUSTER), Sep. 2012, pp. 144-154.

Cluster File Systems, Inc., "Lustre: A Scalable, High-Performance File System Cluster File Systems, Inc.," info@clusterfs.com, Nov. 2002, pp. 1-13.

F. Wang et al., "Understanding Lustre Filesystem Internals," Oak Ridge National Laboratory, Tech Report ORNL/TM-2009/117, Apr. 2010, 80 pages.

U.S. Appl. No. 13/728,421 filed in the name of S. Faibish et al. on Dec. 27, 2012 and entitled "Burst Buffer Appliance Comprising Multiple Virtual Machines."

U.S. Appl. No. 14/134,773 filed in the name of S. Faibish et al. on Dec. 19, 2013 and entitled "Cluster File System Comprising Virtual File System Having Corresponding Metadata Server."

* cited by examiner

CLUSTER FILE SYSTEM COMPRISING MULTIPLE BURST BUFFERS EACH INCLUDING VIRTUAL FILE SYSTEM AND METADATA SERVER COMPONENTS

FIELD

The field relates generally to information processing systems, and more particularly to information processing systems that incorporate cluster file systems.

BACKGROUND

It is common in high-performance computing (HPC) systems and other information processing systems for multiple compute nodes to access a cluster file system. For example, HPC systems such as supercomputers typically include large numbers of compute nodes that access a common file system, also referred to as a cluster file system. A cluster file system as the term is broadly used herein generally allows multiple compute nodes or other types of clients to share access to files over a network.

One well-known cluster file system is the Lustre file system. Lustre is a Linux-based, high-performance cluster file system utilized for computer clusters ranging in size from small workgroup clusters to large-scale, multi-site clusters. Lustre can readily scale to support tens of thousands of clients, petabytes of storage capacity, and hundreds of gigabytes per second of aggregate input-output (IO) throughput. Due to its high performance and scalability, Lustre is utilized in many supercomputers, as well as other complex computing environments, including large enterprise data centers.

In conventional Lustre implementations, it can be difficult to balance the conflicting requirements of storage capacity and IO throughput. IO operations on object storage servers are generally performed directly with back-end storage arrays associated with those servers, and the corresponding storage devices may not be well matched to the current needs of the system. This can lead to situations in which either performance is less than optimal or the costs of implementing the system become excessive.

Accordingly, despite the many advantages of Lustre file systems and other similar cluster file systems, a need remains for additional improvements, particularly with regard to IO operations. For example, further acceleration of IO operations, leading to enhanced system performance relative to conventional arrangements, would be desirable. Additionally or alternatively, an ability to achieve particular levels of performance at lower cost would be advantageous.

SUMMARY

Illustrative embodiments of the present invention provide techniques for implementing a cluster file system in which multiple burst buffers each comprise virtual file system and metadata server components.

The resulting arrangements allow a cluster file system to be configured in a particularly efficient manner utilizing any type of underlying parallel file system, thereby permitting acceleration of IO operations, leading to enhanced system performance relative to conventional arrangements, while also providing an ability to achieve particular levels of performance at lower cost.

Moreover, compliance with particular interface standards commonly used by legacy applications in HPC systems is provided.

In one embodiment, a cluster file system comprises a parallel file system and a plurality of burst buffers. The burst buffers are collectively configured to provide an interface between the parallel file system and compute nodes of a computer system. Each of the burst buffers comprises a virtual file system component and a metadata server component.

Each burst buffer additionally comprises a high-speed electronic memory, illustratively a flash memory. In such an arrangement, each burst buffer independently manages its own flash memory, but the burst buffers are configured such that data consistency is ensured across their flash memories.

The virtual file system components of respective ones of the burst buffers collectively implement a virtual file system. Metadata relating portions of the virtual file system to portions of the parallel file system is stored in a distributed manner over the metadata server components of the respective burst buffers.

By way of example, the virtual file system illustratively comprises a parallel log-structured file system (PLFS) and the metadata server components illustratively comprise respective IO forwarding servers.

Other embodiments include, without limitation, methods, apparatus, systems, and articles of manufacture comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising private and public cloud computing or storage systems, as well as other types of processing systems comprising physical or virtual processing resources in any combination.

Figure 1:
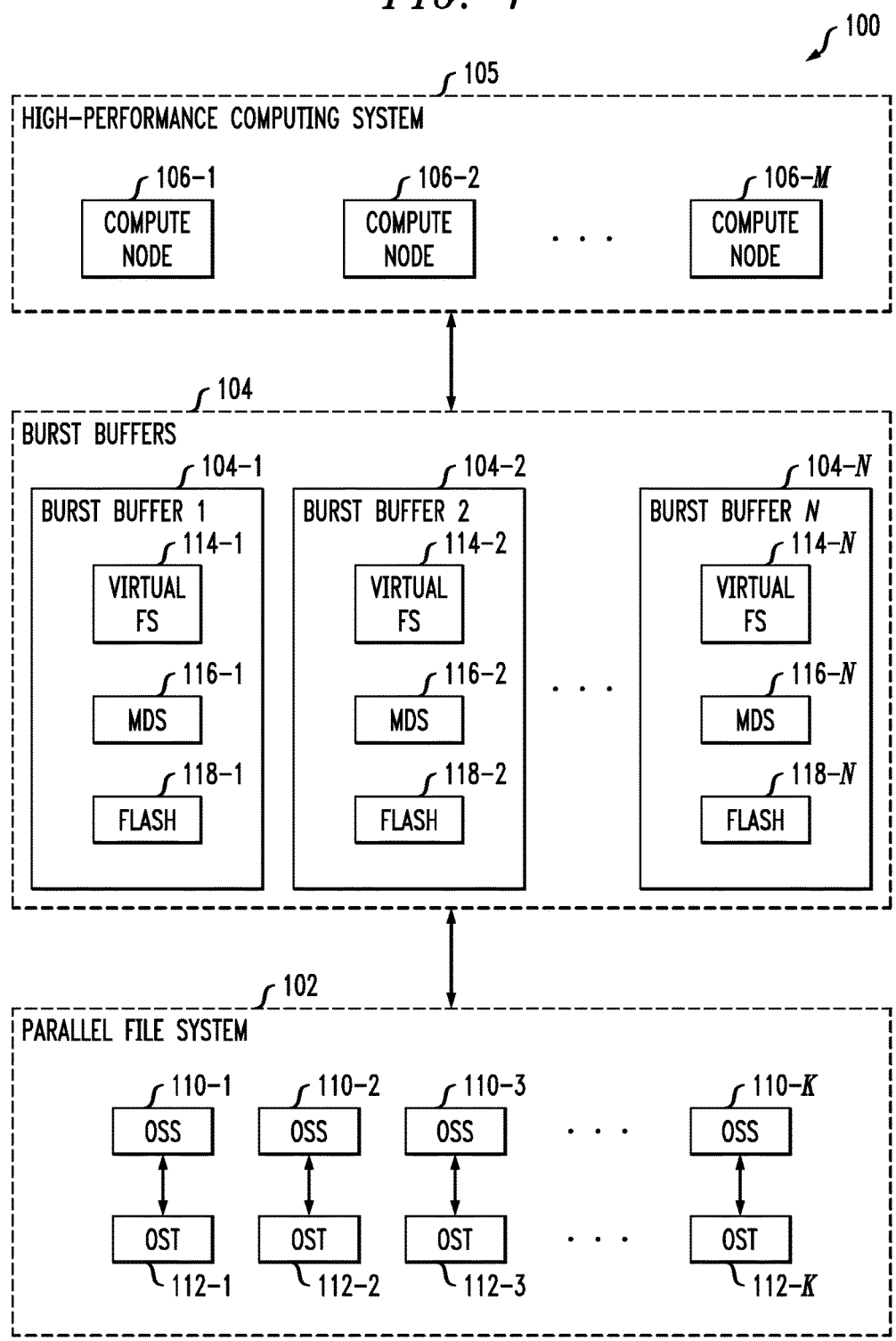
FIG. 1 is a block diagram of an information processing system incorporating a cluster file system comprising multiple burst buffers in an illustrative embodiment of the invention.

FIG. 1 shows an information processing system 100 configured in accordance with an illustrative embodiment of the present invention. The information processing system 100 comprises a parallel file system 102, a plurality of burst buffers 104 and an HPC system 105 comprising a plurality of compute nodes 106-1, 106-2, . . . 106-M. The HPC system 105 may comprise, for example, a supercomputer. Such an HPC system is an example of what is more generally referred to herein as a "computer system."

The parallel file system 102 and burst buffers 104 collectively provide one example of what is more generally referred to herein as a "cluster file system." The cluster file system provides storage resources for use by the compute nodes 106 of the HPC system 105.

The cluster file system comprising parallel file system 102 and burst buffers 104 may be implemented in part using components of a Lustre file system. Conventional aspects of Lustre file systems are described in, for example, Cluster File Systems, Inc., "Lustre: A Scalable, High-Performance File System," November 2002, pp. 1-13, and F. Wang et al., "Understanding Lustre Filesystem Internals," Tech Report ORNL/TM-2009/117, April 2010, pp. 1-95, which are incorporated by reference herein. Other types of file systems can be used in implementing the parallel file system 102 in other embodiments. For example, other embodiments can utilize a distributed file system such as Hadoop Distributed File System (HDFS), or a combination of a Lustre file system and an HDFS. The parallel file system 102 can be essentially any type of file system, including Lustre, HDFS, Network File System (NFS), General Parallel File System (GPFS), Ceph and numerous others, as well as combinations thereof.

The term "cluster file system" as used herein is therefore intended to be broadly construed, so as to encompass a wide variety of different file systems that can be shared by clusters of compute nodes, as well as various combinations of such file systems.

As illustrated in the figure, the parallel file system 102 comprises a plurality of object storage servers or OSSs 110 having corresponding object storage targets or OSTs 112. These pairs of OSS and OST components are illustratively arranged in parallel with one another as shown in the figure. Although only a single OST is associated with each OSS in the FIG. 1 embodiment, this is for purposes of clarity and simplicity of illustration only, and other embodiments may associate multiple OSTs with each OSS.

The OSSs are more particularly denoted as OSSs 110-1, 110-2, 110-3, . . . 110-K, and the OSTs are more particularly denoted as OSTs 112-1, 112-2, 112-3, . . . 112-K. Although the OSTs 112 are shown as being external to the OSSs 110 in the FIG. 1 embodiment, in other embodiments an OST may be at least partially implemented within a corresponding OSS. It should therefore be appreciated that the term "object storage server" as used herein is intended to be broadly construed, and in other embodiments a given object storage server may incorporate one or more associated object storage targets.

The OSTs 112 of parallel file system 102 are illustratively implemented using one or more underlying storage arrays. Such storage arrays may comprise, for example, storage products such as VNX® and Symmetrix VMAX®, both commercially available from EMC Corporation of Hopkinton, Mass. A variety of other storage products may be utilized to implement at least a portion of the OSTs 112 of the parallel file system 102.

Figure 11:
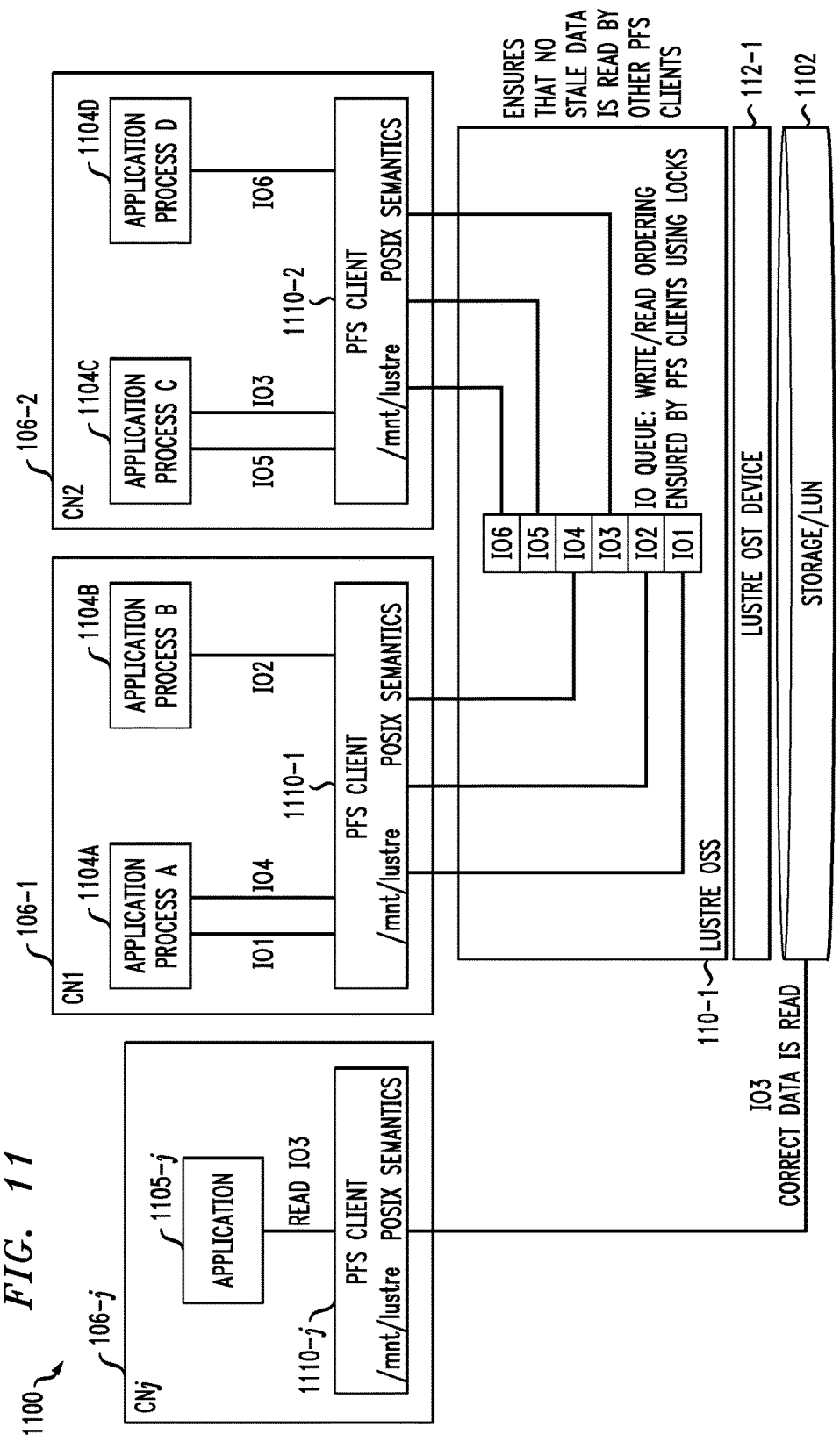
FIGS. 11 and 12 illustrate the manner in which burst buffers are configured to ensure data consistency across their respective flash memories in one embodiment.
Figure 12:
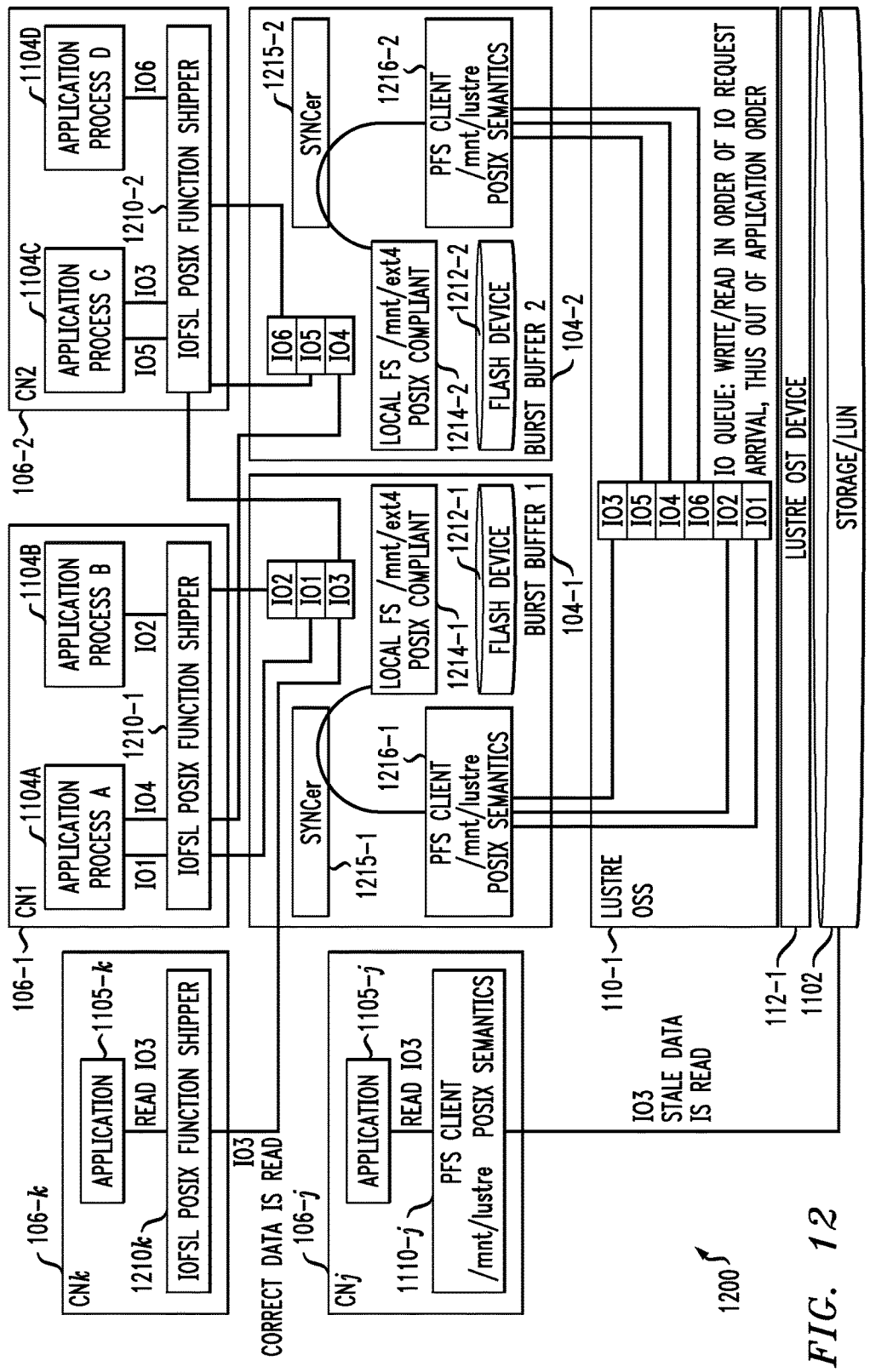

In some embodiments, a given OST is implemented as a separate device associated with an underlying storage array or other storage product. Examples of such an arrangement are shown in FIGS. 11 and 12. Alternatively, an OST may comprise a storage array itself, or a portion of such an array or other storage product. Accordingly, the term "OST" as used herein is also intended to be broadly construed.

It should be noted that the parallel file system 102 is configured in some embodiments so as to comprise multiple distinct storage tiers, such as a plurality of different object storage server tiers with each such tier possibly utilizing object storage targets implemented using different types of storage devices. For example, the parallel file system 102 may include a first storage tier implemented using flash servers or other high-speed storage devices and one or more additional lower storage tiers implemented using disk storage devices.

Terms such as "high-speed" and "low-speed" as used herein with reference to a given storage tier or storage devices thereof are relative terms that are intended to be broadly construed, and do not require any particular absolute level of operating speed.

By way of example, the storage devices of a high-speed storage tier may comprise respective flash Peripheral Component Interconnect express (PCIe) cards, although numerous other types of storage devices that exhibit low access times relative to typical disk storage devices may be used. Thus, other types of low-latency memory could be used instead of or in combination with flash memory in other embodiments. Typically, such low-latency memories comprise electronic memories, which may be implemented using non-volatile memories, volatile memories or combinations of non-volatile and volatile memories. More particular examples of alternatives to flash storage devices that may be used in other embodiments of the invention include non-volatile memories such as magnetic random access memory (MRAM) and phase change random access memory (PC-RAM).

The parallel file system 102 is shown in the figure as comprising only a single storage tier, again for purposes of clarity and simplicity of illustration.

The burst buffers 104 are collectively configured to provide an interface between the parallel file system 102 and the compute nodes 106 of the HPC system 105. Each of the burst buffers 104 comprises a virtual file system (Virtual FS) component 114 and a metadata server (MDS) component 116.

Each burst buffer 104 additionally comprises a high-speed electronic memory, illustratively a flash memory 118. As will be described in more detail below, each burst buffer independently manages its own flash memory, but the burst buffers are configured such that data consistency is ensured across their flash memories. The flash memories 118 may be configured in the form of respective flash servers each implemented using one or more flash storage devices, although other types of high-speed memories and associated storage devices can additionally or alternatively be used.

The individual burst buffers in the plurality of burst buffers 104 are more particularly denoted as burst buffers 104-1, 104-2, . . . 104-N, with respective virtual file system components denoted 114-1, 114-2, . . . 114-N, respective metadata server components denoted 116-1, 116-2, . . . 116-N, and respective flash memories denoted 118-1, 118-2, . . . 118-N.

The burst buffers 104 in some embodiments are implemented as respective burst buffer appliances. Alternatively, multiple ones of the burst buffers 104 may be associated with a single burst buffer appliance.

The virtual file system components 114 of respective ones of the burst buffers 104 collectively implement a virtual file system. Metadata relating portions of the virtual file system to portions of the parallel file system 102 is stored in a distributed manner over the metadata server components 116 of the respective burst buffers 104. The metadata server components 116 of the respective burst buffers 104 may therefore be viewed as collectively implementing a metadata server for the virtual file system.

By way of example, the virtual file system illustratively comprises a parallel log-structured file system (PLFS) and the metadata server components illustratively comprise respective IO forwarding servers.

Additional details regarding PLFS can be found in J. Bent et al., "PLFS: A Checkpoint Filesystem for Parallel Applications," ACM/IEEE Conference on High Performance Computing Networking, Storage and Analysis, SC09, Portland, Oreg., Nov. 14-20, 2009, pp. 1-12, which is incorporated by reference herein. It is to be appreciated, however, that use of PLFS is not a requirement of the present invention, and other types of virtual file systems may be used in other embodiments.

The virtual file system collectively implemented by the virtual file system components 114 of the respective burst buffers 104 receives files from each of one or more clients associated with the compute nodes 106 and arranges those files into objects for object-based storage in the parallel file system 102. The arrangement of files into objects may involve, for example, associating multiple files with a single object. As noted above, the virtual file system may be implemented using PLFS and in such an embodiment arranging the files into objects may comprise associating multiple ones of the files with a single PLFS object.

The virtual file system in the present embodiment can also be configured to perform additional storage-related functions, such as arranging retrieved objects into corresponding files for delivery to requesting clients, and controlling movement of objects between multiple storage tiers of the parallel file system 102 in order to facilitate achievement of desired levels of performance by the clients.

The term "client" in this context is intended to be broadly construed, so as to encompass, for example, a compute node or a component thereof. Such a component may be implemented in software, and therefore a "client" as the term is utilized herein may comprise a software component associated with one of the compute nodes 106. Other types of clients can be used in other embodiments.

Although not explicitly illustrated in the figure, one or more job schedulers may be implemented in the system 100. A given job scheduler generally receives IO requests from applications running on one or more of the compute nodes 106. Such IO requests and other similar requests referred to herein may be configured, for example, in accordance with standard portable operating system interface (POSIX) system calls.

The virtual file system generally serves to provide an interface between files that are read and written by the compute nodes 106 and corresponding objects that are stored in the parallel file system 102. The virtual file system updates the metadata stored in the metadata server components 116 responsive to generation of new objects, reconfiguration of existing objects, and object movement within the parallel file system 102.

A given one of the metadata server components 116 stores information for each of a plurality of objects processed by the corresponding one of the burst buffers 104. By way of example, such information for a given object illustratively comprises file metadata, such as file names, directory structures, and access permissions, relating to multiple files associated with the given object, as well as a pointer or hyperlink indicating the location of that object within the parallel file system 102. Numerous other types of additional or alternative information used to facilitate object-based storage in the parallel file system 102 may be stored in the metadata server components 116.

Although only a single metadata server component is shown in each of the burst buffers 104 in the FIG. 1 embodiment, it should be understood that these and other components may be replicated in one or more of the burst buffers. For example, multiple metadata servers can be implemented, with each such metadata server comprising metadata server components residing on respective ones of the burst buffers.

It is to be appreciated that the configuration of the burst buffers 104 as illustrated in FIG. 1 is exemplary only. For example, the burst buffers 104 may comprise other types of components not explicitly shown, such as one or more analytics engines. Also, a burst buffer may receive data from a variety of sources other than the compute nodes 106, although such other sources are not explicitly shown in the figure. For example, the burst buffer may receive data files comprising sensor data received from sensor networks. It is to be appreciated that a wide variety of additional or alternative data sources may provide data to the burst buffers 104 for storage in the parallel file system 102 in other embodiments.

The burst buffers 104 are generally configured to accelerate IO operations between the compute nodes 106 and the parallel file system 102.

By way of example, the burst buffers 104 in the present embodiment may be configured to enhance the IO throughput performance of the information processing system 100 by supporting fast checkpointing of one or more compute nodes 106. More particularly, the compute nodes 106 can write data files comprising checkpoint data to the burst buffers 104 at very high speeds, and that checkpoint data is later written at a much slower rate from the burst buffers to the parallel file system 102. This ensures that other operations of the compute nodes 106 are not unduly delayed by the writing of checkpoint data while also allowing the system 100 to continue to utilize the parallel file system 102.

The term "burst buffer" as used herein is intended to be broadly construed, so as to encompass any network appliance or other arrangement of hardware and associated software or firmware that includes a high-speed memory and serves as a buffer between one or more compute nodes and a parallel file system, for storing bursts of data associated with different types of IO operations.

Communications between the parallel file system 102 and the burst buffers 104, and between the burst buffers 104 and the compute nodes 106, are assumed to take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

At least portions of the parallel file system 102, burst buffers 104 and compute nodes 106 are implemented using one or more processing platforms, examples of which will be described in greater detail below in conjunction with FIGS. 13 and 14. A given such processing platform comprises at least one processing device comprising a processor coupled to a memory, and the processing device may be implemented at least in part utilizing one or more virtual machines.

Although shown in FIG. 1 as being separate from the parallel file system 102 and compute nodes 106, the burst buffers 104 in other embodiments may be implemented at least in part within one or more of these system elements.

It is also to be appreciated that a given embodiment of the information processing system 100 may include multiple instances of one or more of the parallel file system 102, the set of N burst buffers 104 and the set of M compute nodes 106, although only a single instance of each of these elements is shown in the system diagram of FIG. 1 for clarity and simplicity of illustration.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in greater detail with reference to the flow diagram of FIG. 2. The process as shown includes steps 200 through 204, and is described with reference to elements of the system 100 but is more generally applicable to other systems comprising burst buffers providing an interface between a physical file system and a plurality of compute nodes.

In step 200, burst buffers 104 are configured to collectively provide an interface between the parallel file system 102 and the compute nodes 106.

In step 202, a virtual file system is implemented utilizing virtual file system components 114 of respective ones of the burst buffers 104. As noted above, the virtual file system is illustratively implemented using PLFS, and provides functionality such as associating a single PLFS object with multiple files stored in the parallel file system 102.

In step 204, metadata is stored in the burst buffers 104 relating portions of the virtual file system to portions of the parallel file system 102. The metadata is stored in a distributed manner over the metadata server components 116 of the respective burst buffers 104. For example, the metadata in some embodiments is stored using a striping mechanism that ensures that a given portion of the metadata is stored on only one of the burst buffers. In such an arrangement, metadata is not replicated at each of the metadata server components 116. Instead, different portions of the metadata are stored on different ones of the burst buffers using their respective metadata server components 116, such that the metadata server components collectively implement a metadata server that contains all of the metadata. Upon receipt of an IO request from one of the compute nodes 106, a given one of the burst buffers 104 is accessed to obtain the appropriate metadata for processing the request.

Figure 2:
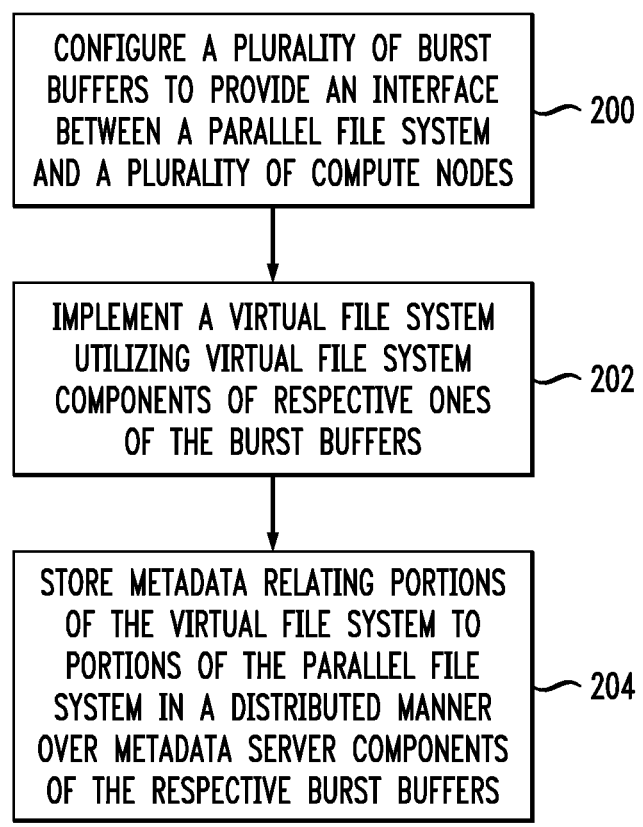
FIG. 2 is a flow diagram of an exemplary process implemented using the cluster file system in the information processing system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations involving utilization of virtual file system components and metadata server components of a plurality of burst buffers. For example, the ordering of the process steps may be varied in other embodiments, or certain steps may be performed concurrently with one another rather than serially. Also, one or more of the process steps may be repeated periodically.

It should be noted that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

One significant advantage of the illustrative embodiments described above is that the compute nodes 106 can continue to operate using POSIX semantics. More particularly, applications running on the compute nodes 106 need not be modified in any way to support PLFS or another type of virtual file system. The compute nodes 106 are therefore not required to utilize a message passing interface (MPI) or other predetermined interface type to communicate with the burst buffers 104. This ensures that the system 100 can operate with legacy applications as well as a wide variety of other applications running on the compute nodes, including applications using POSIX, MPI or other types of interfaces.

In these embodiments, POSIX compliance is handled by the burst buffers 104. Each of the compute nodes 106 illustratively comprises an IO forwarding client configured to forward all POSIX system calls to the virtual file system collectively implemented by the virtual file system components 114 of the respective burst buffers 104. The virtual file system serves as an interface to the parallel file system 102 and operates in conjunction with the metadata server components 116 to ensure data consistency within the system 100.

Exemplary configurations of the burst buffers 104 will now be described with reference to FIGS. 3 and 4. It is assumed for these illustrative embodiments that the virtual file system implemented by the virtual file system components 114 of the respective burst buffers 104 comprises PLFS.

Figure 3:
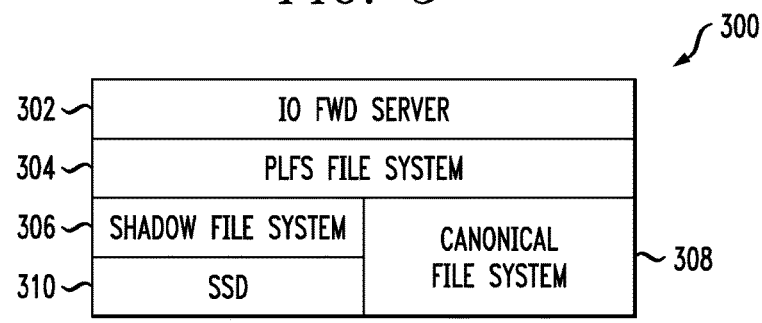
FIGS. 3 and 4 show illustrative embodiments of a given one of the burst buffers of the FIG. 1 system.

Referring initially to FIG. 3, a given one of the burst buffers 104 in this embodiment illustratively comprises a set of components 300 that includes an IO forwarding (FWD) server 302, a PLFS component 304, a shadow file system component 306, a canonical file system component 308, and at least one solid state drive (SSD) 310.

The IO forwarding server 302 is an example of what is more generally referred to herein as a metadata server component of the burst buffer, and the PLFS component 304 is an example of what is more generally referred to herein as a virtual file system component of the burst buffer. The SSD 310 is an example of a high-speed storage device and is used to implement the flash memory of the burst buffer.

The IO forwarding servers implemented within the respective burst buffers expose PLFS to the compute nodes 106. The compute nodes 106 can access PLFS and the underlying parallel file system 102 only through the IO forwarding servers. As indicated previously, the compute nodes 106 comprise IO forwarding clients configured to communicate with the IO forwarding servers at least in part utilizing POSIX semantics.

The shadow file system component 306 in this embodiment is an example of a local file system provided by the burst buffer 300. The local file system has no global view of the data stored in the parallel file system 102. However, the local file system has a much higher IO processing bandwidth compared to the underlying parallel file system 102, which is assumed to be associated with the canonical file system component 308. The local file system buffers peak IO throughput, and relies on PLFS to provide the compute nodes 106 with a global view of the data. For example, when a given compute node attempts to access a specific piece of data, PLFS will direct the corresponding request to the appropriate burst buffer and local file system that currently contains that data. Also, data can be moved between the local file systems of the respective burst buffers and the underlying canonical file system under the control of PLFS. Exemplary interactions between PLFS and shadow and canonical file system components will be described in more detail in conjunction with FIGS. 5 through 10.

Figure 4:
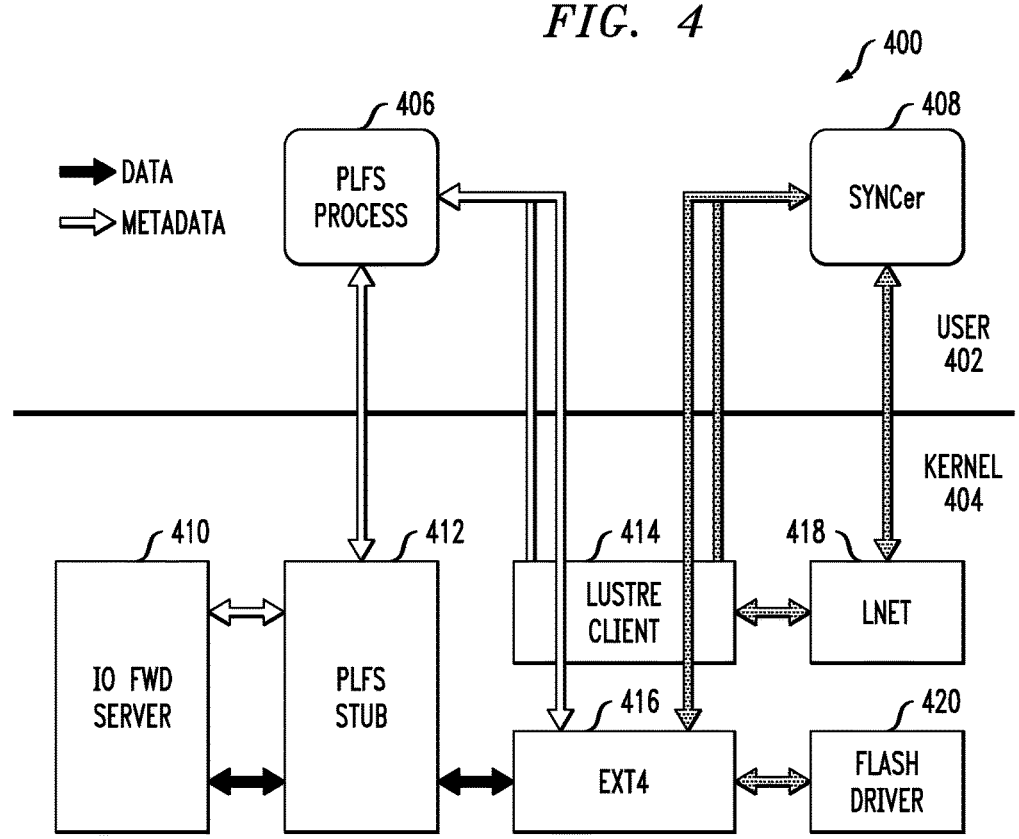

FIG. 4 shows a portion 400 of a given one of the burst buffers 104 in an illustrative embodiment. The portion 400 of the given burst buffer 104 is separated into user space 402 and kernel space 404. The user space 402 comprises a PLFS process 406 and a synchronization module or SYNCer 408. The kernel space 404 comprises an IO forwarding server 410, a PLFS stub 412, a Lustre client 414, a file system controller 416 illustratively implemented as an Ext4 module, a Lustre networking (LNET) module 418 coupled to the Lustre client 414, and a flash driver 420. In this context and elsewhere herein, Ext4 denotes a well-known extended file system for Linux. The thick arrows in the figure utilize two different types of shadings to indicate the flow of data and metadata, respectively, between burst buffer elements. A third shading type indicates flows involving both data and metadata.

The PLFS functionality of the burst buffer in this embodiment is separated between the user space PLFS process 406 and the kernel space PLFS stub 412. This is to avoid moving the entire PLFS functionality into the kernel space, which would introduce additional complexity as well as limit subsequent extension or modification. Accordingly, only a limited portion of the PLFS functionality, represented by the PLFS stub 412, is implemented in the kernel space 404 in this embodiment. The limited portion includes data path functionality and as a result the PLFS process 406 in the user space 402 is configured only for processing metadata. The PLFS data path passes through the PLFS stub 412 as indicated.

The PLFS process 406 running in the user space 402 of the given burst buffer and the PLFS stub 412 running in the kernel space 404 of the given burst buffer collectively provide an example of one possible implementation of the virtual file system component 114 of the given burst buffer. It is to be appreciated that numerous other virtual file system component configurations can be used in other embodiments.

The IO forwarding server 410 running in the kernel space 404 of the given burst buffer is an example of one possible implementation of the metadata server component 116 of the given burst buffer. Again, numerous other metadata server component configurations can be used in other embodiments.

The flash driver 420 is configured to provide the virtual file system component comprising PLFS process 406 and PLFS stub 412 and the metadata server component comprising IO forwarding server 410 with access to the flash memory of the burst buffer. As mentioned previously, each of the burst buffers independently manages its flash memory, but the burst buffers are configured such that data consistency is ensured across the flash memories of the respective burst buffers. Data is written to the flash memory directly in the kernel space 404 via the PLFS stub 412. Metadata is exchanged between the PLFS process 406 and elements 412, 414 and 416 of the kernel space 404.

A burst buffer configured as illustrated in FIG. 4 executes exemplary open, read, write and close operations in the following manner:

1. Open. The PLFS stub 412 in the kernel space 404 creates an in-kernel index node ("inode") data structure. It makes an up-call to the PLFS process 406 in the user space 402 to create an index dropping file dropping.index.xxxx and a data dropping file dropping.data.xxxx for an associated write operation. In the case of an associated read operation, it may instead direct PLFS process 406 to create a global index tree for the read operation. The PLFS process 406 returns an inode number ("ino") of the dropping.data.xxxx file to the PLFS stub 412 so that it can get a corresponding backend inode from the local file system of the flash memory for future writes to this file.

2. Write. The PLFS stub 412 appends the data to the backend inode created at open. It then makes an up-call to the PLFS process 406 indicating a requested logical offset and length and a physical offset in the backend inode to record the index entry.

3. Read. The PLFS stub 412 makes an up-call to the PLFS process 406 with the requested offset and length, and the PLFS process 406 returns location information for the data, possibly in the form of a list of multiple locations, such as [{ino, offset, length}, {ino, offset, length} . . . ]. The PLFS stub 412 then reads the data according to the location information. The IO forwarding server 410 sends the data back to an IO forwarding client running on the compute node 106. If the data only exists in the parallel file system 102, the SYNCer 408 first brings the data from the parallel file system into the local file system, also referred to elsewhere herein as the flash file system.

4. Close. The PLFS stub 412 releases the in-kernel inode and makes an up-call to the PLFS process 406 to free its in-memory data structures. The PLFS process 406 determines appropriate placement for the closed data file. This may also involve removing any cached copy of the data file that was obtained from the parallel file system 102 by the SYNCer 408 in the read operation.

A number of additional examples of the above-described open, write, read and close operations will now be presented with reference to FIGS. 5 through 10. In each of these examples, signal flow between system entities is shown in the corresponding figure. The system entities include an IO forwarding client (IO FWDc) implemented on one of the compute nodes 106, IO forwarding server 410 (IO FWDs) implemented on one of the burst buffers 104, PLFS stub 412 in kernel space 404 (PLFSk) of the burst buffer, PLFS process 406 in user space 402 (PLFSu) of the burst buffer, a flash file system (Flash FS) implemented using the flash memory of the burst buffer, and the parallel file system (PFS) 102. Some of the operations illustrated in these examples also involve use of the SYNCer 408 of the burst buffer.

Figure 5:
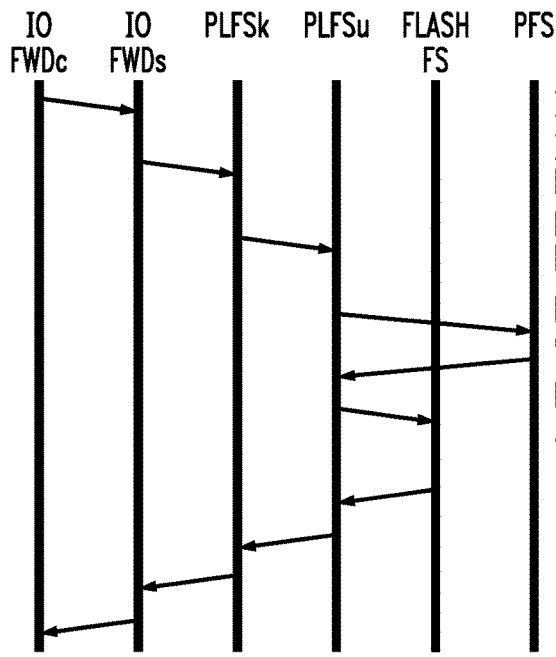
FIGS. 5 through 10 are signal flow diagrams illustrating various operations performed in one possible implementation of the FIG. 1 system.

FIG. 5 shows an exemplary open operation denoted open(/foo, O_WR). IO FWDc sends a corresponding request to IO FWDs, and IO FWDs dispatches the request to PLFSk. PLFSk queries the inode of the file to PLFSu, and PLFSu checks the PLFS container on PFS. PLFSu then creates the index and data files and initializes the in-memory index.

Figure 6:
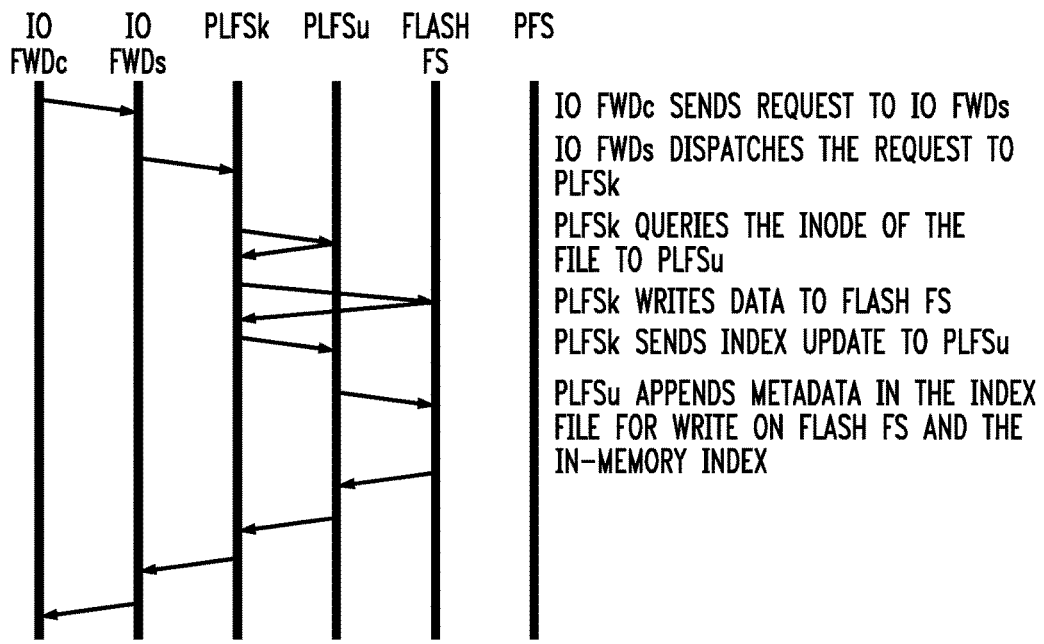

FIG. 6 shows an exemplary write operation denoted write(fd, buf, offset, len), where fd, buf and len denote file descriptor, buffer and length, respectively. IO FWDc sends a corresponding request to IO FWDs, and IO FWDs dispatches the request to PLFSk. PLFSk queries the inode of the file to PLFSu, writes data to Flash FS and sends index update to PLFSu. PLFSu then appends metadata in the index file for the write to Flash FS and the in-memory index.

Figure 7:
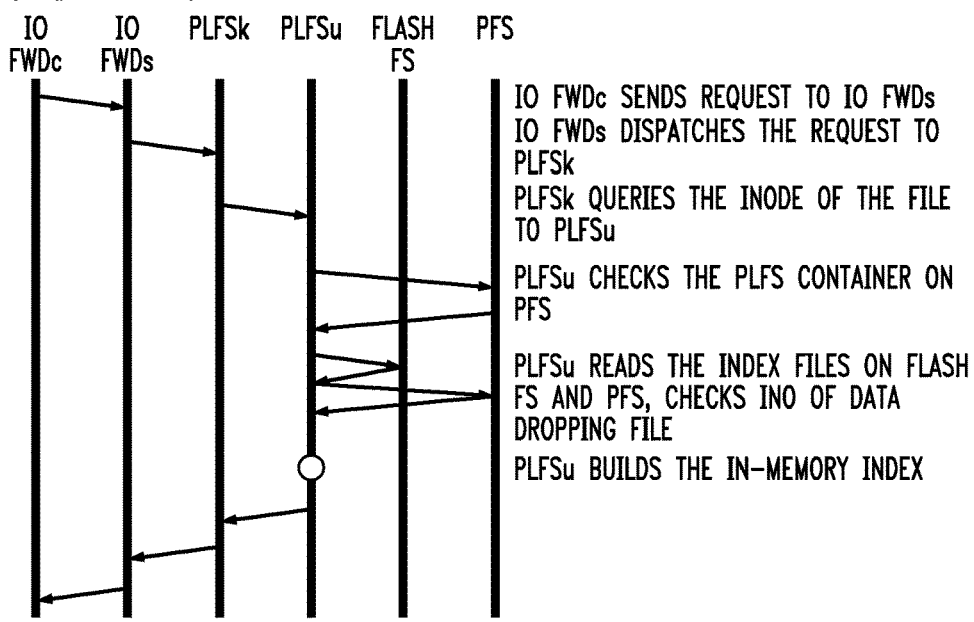

FIG. 7 shows an exemplary open operation denoted open(/foo, O_RD). IO FWDc sends a corresponding request to IO FWDs, and IO FWDs dispatches the request to PLFSk. PLFSk queries the Mode of the file to PLFSu, and PLFSu checks the PLFS container on PFS. PLFSu then reads the index files on Flash FS and PFS, checks the ino of the data dropping file, and builds the in-memory index.

Figure 8:
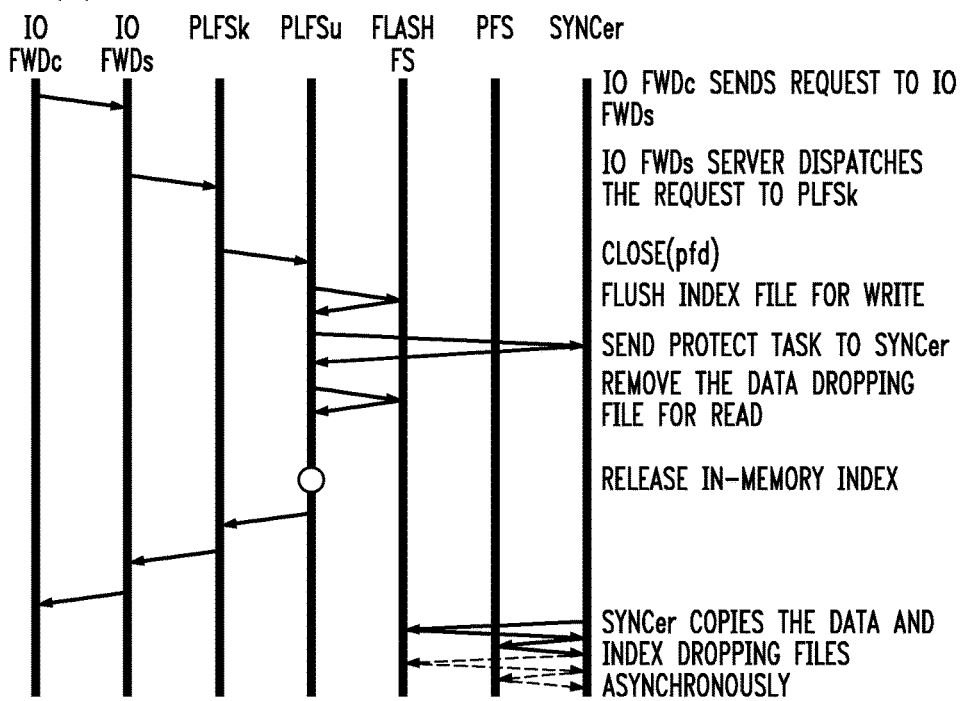

FIG. 8 shows an exemplary close operation denoted close (fd). IO FWDc sends a corresponding request to IO FWDs, and IO FWDs dispatches the request to PLFSk. PLFSk directs PLFSu to free its in-memory index, using an operation denoted as close(pfd). PLFSu flushes the index file for the write, sends a protect task to SYNCer, removes the data dropping file for read, and releases the in-memory index. SYNCer then copies the data and index dropping files asynchronously as indicated.

Figure 9:
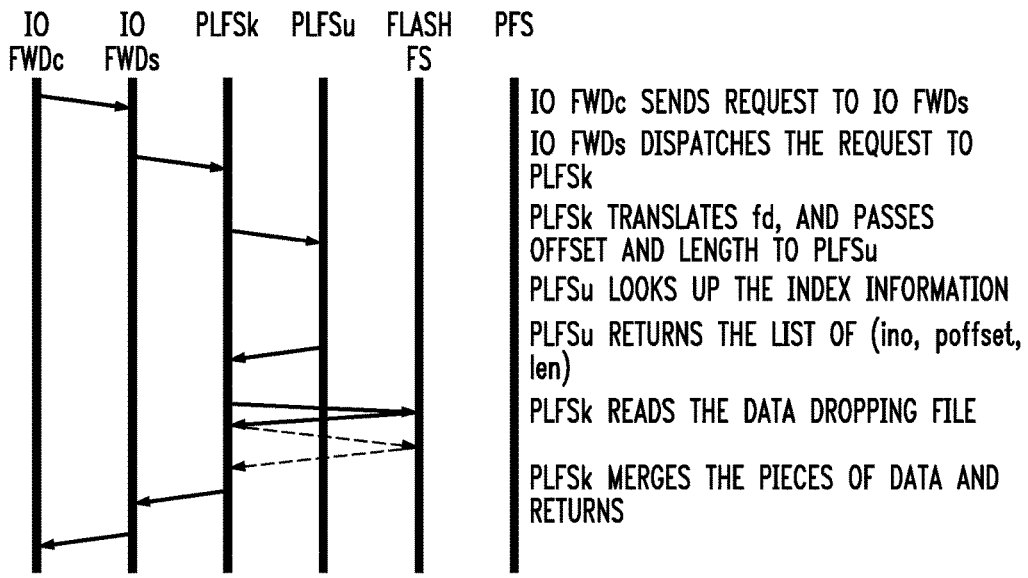

FIG. 9 shows an exemplary read operation denoted read (fd, buf, offset, len), under an assumption that the requested data resides in the Flash FS. IO FWDc sends a corresponding request to IO FWDs, and IO FWDs dispatches the request to PLFSk. PLFSk translates fd, and passes offset and length to PLFSu. PLFSu looks up the index information, and returns the list of (ino, poffset, len) entries to PLFSk. PLFSk then reads the data dropping file, merges the file segments and returns the requested data. The file segments are also referred to in the context of the figures as "pieces" of data.

Figure 10:
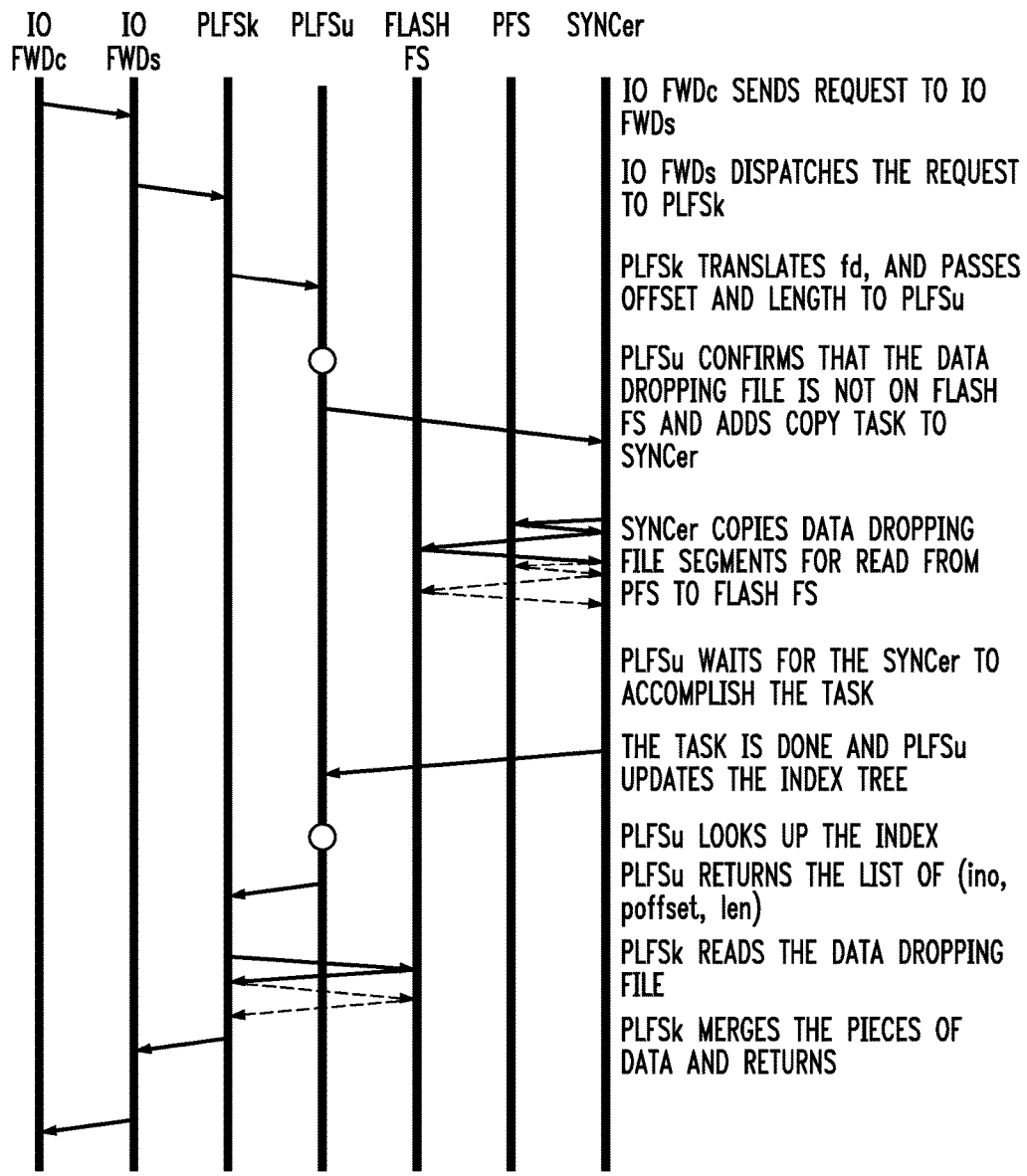

FIG. 10 shows an exemplary read operation denoted read(fd, O_RD, offset, len), under an assumption that the requested data resides in the PFS. IO FWDc sends a corresponding request to IO FWDs, and IO FWDs dispatches the request to PLFSk. PLFSk translates fd, and passes offset and length to PLFSu. PLFSu confirms that the data dropping file is not on Flash FS, and adds a copy task to SYNCer. SYNCer copies the data dropping file segments for read from PFS to Flash FS. PLFSu waits for SYNCer to accomplish the task, under an assumption that SYNCer provides a local callback mechanism to notify PLFSu that the task is done. Once the task is done, PLFSu updates the index tree, looks up the index information, and returns the list of (ino, poffset, len) entries to PLFSk. PLFSk then reads the data dropping file, merges the file segments and returns the requested data.

It is to be appreciated that the above-described open, write, read and close operations are examples only, and other types of interactions between system elements may be used in implementing similar operations in other embodiments.

The manner in which the burst buffers 104 are configured to ensure data consistency across their respective flash memories in illustrative embodiments will now be described in more detail with reference to FIGS. 11 and 12.

FIG. 11 shows an embodiment of an information processing system 1100 without burst buffers 104. In this embodiment, compute node 106-1 runs application processes 1104A and 1104B, also referred to as Application Process A and Application Process B, respectively. Similarly, compute node 106-2 runs application processes 1104C and 1104D, also referred to as Application Process C and Application Process D, respectively. Another compute node 106-j comprises an application 1105-j. The compute nodes 106-1, 106-2 and 106-j are also denoted in the figure as CN1, CN2 and CNj, respectively.

The compute nodes 106-1, 106-2 and 106-j further comprise respective PFS clients 1110-1, 1110-2 and 1110-j. The PFS clients 1110-1 and 1110-2 are configured to communicate with OSS 110-1 of the parallel file system 102. The OSS 110-1 interfaces with OST 112-1 to access an underlying storage array 1102 implementing one or more logical units (LUNs). The storage array 1102 may comprise, for example, a storage product such as the above-noted VNX® or Symmetrix VMAX®. The OSS 110-1 and OST 112-1 are assumed to comprise a Lustre OSS and a Lustre OST, respectively.

In this embodiment, the PFS clients 1110-1 and 1110-2 communicate directly with the Lustre OSS 110-1 using POSIX semantics. The PFS client 1110-j also utilizes POSIX semantics. The PFS clients 1110 access a shared file system denoted as /mnt/lustre in the figure. The Lustre OSS 110-1 implements an IO queue in which appropriate write/read ordering is ensured by the PFS clients 1110 using locks. This arrangement ensures that no stale data is being read by other PFS clients.

As illustrated in the figure, various IO requests are generated by the compute nodes 106-1 and 106-2 and processed by Lustre OSS 110-1. More particularly, IO requests denoted IO1, IO2, IO3, IO4, IO5 and IO6 are generated in that order by different ones of the application processes 1104. These are processed from the IO queue of the OSS 110-1 in the appropriate order as shown. The compute node 106-j directly accesses the storage array 1102 via its PFS client 1110-j using a duplicate IO request IO3, but nonetheless receives the correct data as an appropriate ordering of IO requests is enforced in the IO queue of the Lustre OSS 110-1. More particularly, the compute node 106-j receives the latest version of the corresponding requested data from the storage array 1102 due to the use of the IO queue and the associated write/read ordering enforced by the PFS clients 1110.

FIG. 12 shows another embodiment of an information processing system 1200 that includes burst buffers 104. This embodiment includes compute nodes 106-1, 106-2, 106-j and 106-k, also denoted in the figure as CN1, CN2, CNj and CNk, respectively.

The compute node 106-j is configured in the same manner as in the FIG. 11 embodiment, and includes application 1105-j and PFS client 1110-j. The other compute nodes 106-1, 106-2 and 106-k do not include PFS clients but instead include respective IO forwarding clients 1210-1, 1210-2 and 1210-k. Such clients are illustratively implemented at least in part utilizing an IO forwarding scalability layer (IOFSL). These IO forwarding clients 1210 utilize POSIX semantics to communicate with corresponding IO forwarding servers implemented in respective ones of the burst buffers 104. Additional details regarding IOFSL can be found in, for example, N. Ali et al, "Scalable I/O Forwarding Framework for High-Performance Computing Systems," IEEE International Conference on Cluster Computing (Cluster 2009), New Orleans, La., September 2009, which is incorporated by reference herein. See also the IOFSL website at www.mcs.anl.gov/research/projects/iofsl.

The burst buffers 104 in this embodiment more particularly comprise first and second burst buffers denoted 104-1 and 104-2. The burst buffers 104-1 and 104-2 comprise respective flash devices 1212-1 and 1212-2, local file systems 1214-1 and 1214-2, SYNCers 1215-1 and 1215-2, and PFS clients 1216-1 and 1216-2. The PFS clients access the shared file system/mnt/lustre using POSIX semantics. The local file systems 1214-1 and 1214-2 implemented using the respective flash devices 1212-1 and 1212-2 of burst buffers 104-1 and 104-2 are each denoted /mnt/ext4 and are POSIX compliant.

The IO forwarding clients 1210-1, 1210-2 and 1210-k, also denoted as respective IOFSL POSIX function shippers in this embodiment, forward the various IO requests generated by the application processes 1104 and application 1105-k to different ones of the burst buffers 104-1 and 104-2. It is assumed that the forwarded requests are received by IO forwarding servers implemented in respective ones of the burst buffers 104, although such IO forwarding servers are not explicitly shown in the figure. It can be seen that different subsets of the IO requests are received by the two burst buffers. More particularly, burst buffer 104-1 receives IO requests IO3, IO1 and IO2 in that order, and burst buffer 104-2 receives IO requests IO4, IO5 and IO6 in that order.

Each of the SYNCers 1215 can access the Lustre OSS 110-1 via its corresponding PFS client 1216 as illustrated. It is assumed that each IO request in this embodiment requires that data be retrieved into one of the burst buffers from the parallel file system 102 comprising Lustre OSS 110-1, Lustre OST 112-1 and the underlying storage array 1102. It can be seen that the IO requests arrive in the IO queue of the OSS 110-1 in the order IO1, IO2, IO6, IO4, IO5 and IO3, and therefore out-of-order with respect to the order in which the requests were generated by the application processes 1104.

In this embodiment, data consistency is enforced by the burst buffers 104-1 and 104-2 using the IO forwarding servers and other components. Accordingly, each of the IO requests received in the burst buffers 104 from the IO forwarding clients 1210 will be processed using the appropriate versions of the corresponding data files. However, the compute node 106-*j* that attempts to directly access the storage array 1102 via its PFS client 1110-*j* using a duplicate IO request IO3 may in this embodiment receive stale data, as an appropriate ordering is not enforced, in the IO queue of the Lustre OSS 110-1. More particularly, a read associated with IO request IO3 may receive stale data, as that request is processed by OSS 110-1 after the IO requests IO4, IO5 and IO6, any one of which may have involved writing to the same data file being read by IO request IO3.

In contrast, a read associated with duplicate IO request IO3 from compute node 106-*k* will receive the correct data, due to the data consistency enforced by the burst buffers 104 in this embodiment.

Illustrative embodiments disclosed herein make it possible to dynamically balance the conflicting requirements of storage capacity and IO throughput, thereby avoiding situations in which either performance is less than optimal or the costs of implementing the system become excessive. Arrangements of this type can provide further acceleration of IO operations in the system 100, leading to enhanced system performance relative to conventional arrangements, while additionally or alternatively providing an ability to achieve particular levels of performance at lower cost.

Moreover, compliance with particular interface standards commonly used by legacy applications in HPC systems is provided. For example, in certain embodiments described above, the compute nodes of an HPC system can continue to operate using POSIX semantics, such that applications running on the compute nodes need not be modified in any way to support PLFS or another type of virtual file system. Instead, the POSIX compliance in such embodiments is handled by the burst buffers.

It was noted above that portions of the information processing system 100 may be implemented using one or more processing platforms. Illustrative embodiments of such platforms will now be described in greater detail. Although described in the context of system 100, these platforms may also be used to implement at least portions of other information processing systems in other embodiments.

Figure 13:
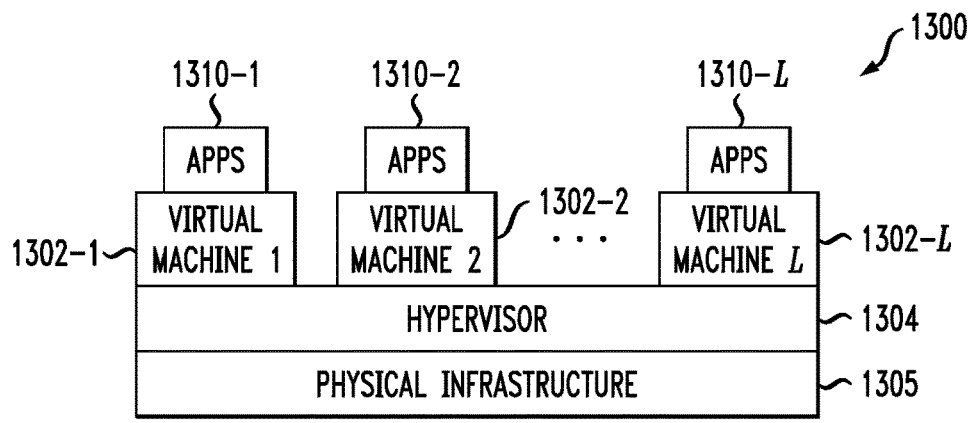
FIGS. 13 and 14 show examples of processing platforms that may be utilized to implement at least a portion of the information processing system of FIG. 1.

As shown in FIG. 13, portions of the information processing system 100 may comprise cloud infrastructure 1300. The cloud infrastructure 1300 comprises virtual machines (VMs) 1302-1, 1302-2, . . . 1302-L implemented using a hypervisor 1304. The hypervisor 1304 runs on physical infrastructure 1305. The cloud infrastructure 1300 further comprises sets of applications 1310-1, 1310-2, . . . 1310-L running on respective ones of the virtual machines 1302-1, 1302-2, . . . 1302-L under the control of the hypervisor 1304.

Although only a single hypervisor 1304 is shown in the embodiment of FIG. 13, the system 100 may of course include multiple hypervisors each providing a set of virtual machines using at least one underlying physical machine. Different sets of virtual machines provided by one or more hypervisors may be utilized in configuring the burst buffers 104, although virtualization may additionally or alternatively be utilized in other system components.

An example of a commercially available hypervisor platform that may be used to implement hypervisor 1304 and possibly other portions of the information processing system 100 in one or more embodiments of the invention is the VMware® vSphere® which illustratively has an associated virtual infrastructure management system such as the VMware® vCenter™. The underlying physical machines may comprise one or more distributed processing platforms that include storage products, such as the above-noted VNX® and Symmetrix VMAX® storage products. A variety of other storage products may be utilized to implement at least a portion of the system 100.

One or more of the processing modules or other components of system 100 may therefore each run on a computer, server, storage device or other processing platform element. A given such element may be viewed as an example of what is more generally referred to herein as a "processing device." The cloud infrastructure 1300 shown in FIG. 13 represents at least a portion of one processing platform.

Figure 14:
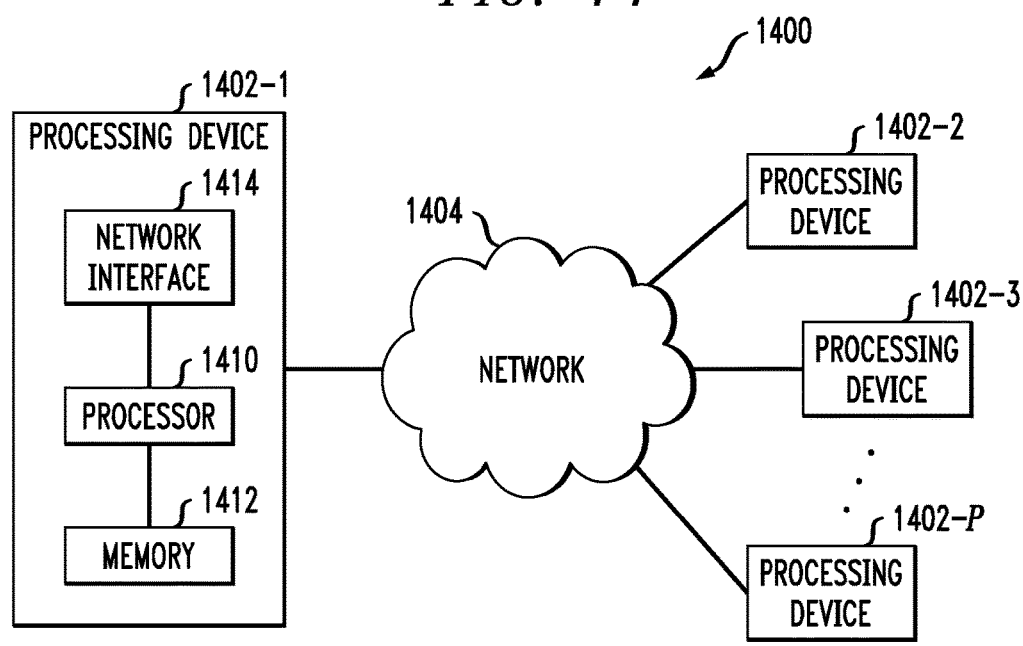

Another example of such a processing platform is processing platform 1400 shown in FIG. 14. The processing platform 1400 in this embodiment comprises a portion of system 100 and includes a plurality of processing devices, denoted 1402-1, 1402-2, 1402-3, . . . 1402-P, which communicate with one another over a network 1404.

The network 1404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1402-1 in the processing platform 1400 comprises a processor 1410 coupled to a memory 1412.

The processor 1410 may comprise a microprocessor, a microcontroller, an application-specific integrated circuit (ASIC), a field-programmable gate array (FPGA) or other type of processing circuitry, as well as portions or combinations of such circuitry elements.

The memory 1412 may comprise random access memory (RAM), read-only memory (ROM) or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of a burst buffer as disclosed herein can be implemented at least in part in the form of one or more software programs stored in memory and executed by a processor of a processing device such as one of the virtual machines 1302 or one of the processing devices 1402.

It should again be emphasized that the above-described embodiments of the invention are presented for purposes of illustration only. Many variations and other alternative embodiments may be used. For example, the disclosed techniques are applicable to a wide variety of other types of information processing systems, file systems and computer systems that can benefit from the performance advantages associated with use of a plurality of burst buffers each having virtual file system and metadata server components. Also, the particular configurations of system and device elements and associated processing functionality as shown in the figures can be varied in other embodiments. Thus, for example, the particular type of virtual file system and parallel file system deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a parallel file system; and
a plurality of burst buffers collectively configured to provide an interface between the parallel file system and a plurality of compute nodes for accelerating input-output (IO) operations directed to the parallel file system, the plurality of burst buffers being implemented external to the parallel file system;
wherein each of the burst buffers comprises a virtual file system component and a metadata server component;
wherein the virtual file system components of respective ones of the burst buffers collectively implement a virtual file system;
wherein metadata relating portions of the virtual file system to portions of the parallel file system is stored in a distributed manner over the metadata server components of the respective burst buffers;
the virtual file system component in a given one of the burst buffers comprising a first portion running in a user space of the given burst buffer and a second portion running in a kernel space of the given burst buffer;
the first portion of the virtual file system component in the given burst buffer being configured to process metadata for IO operations received from one or more of the plurality of compute nodes;
the second portion of the virtual file system component in the given burst buffer being configured to provide a data path for accessing a memory of the given burst buffer to perform one or more of the IO operations received from one or more of the plurality of compute nodes; and
wherein the given burst buffer further comprises:
a synchronization component running in the user space of the given burst buffer, the synchronization component being configured to copy files between the parallel file system and a local file system of the memory of the given burst buffer, the local file system running in the kernel space of the given burst buffer; and
a memory driver running in the kernel space of the given burst buffer, the memory driver being configured to provide the second portion of the virtual file system component and the metadata component of the given burst buffer with access to the memory of the given burst buffer.

2. The apparatus of claim 1 wherein the virtual file system comprises a parallel log-structured file system (PLFS).

3. The apparatus of claim 2 wherein:
the first portion of the virtual file system component in the given burst buffer comprises a PLFS process running in a user space of the given burst buffer; and
the second portion of the virtual file system component in the given burst buffer comprises a PLFS stub running in a kernel space of the given burst buffer.

4. The apparatus of claim 1 wherein the parallel file system comprises a Lustre file system and a given one of the burst buffers further comprises:
a Lustre client; and
a Lustre networking (LNET) module coupled to the Lustre client.

5. The apparatus of claim 1 wherein the metadata server components comprise respective input-output (TO) forwarding servers.

6. The apparatus of claim 5 wherein the compute nodes comprise IO forwarding clients configured to communicate with the IO forwarding servers at least in part utilizing portable operating system interface (POSIX) semantics.

7. The apparatus of claim 1 wherein the metadata is stored in a distributed manner across the metadata server components of the respective burst buffers using a striping mechanism that ensures that a given portion of the metadata is stored on only one of the burst buffers.

8. The apparatus of claim 1 wherein responsive to an TO request from one of the compute nodes a given one of the burst buffers is accessed to obtain metadata for use in processing the request.

9. The apparatus of claim 1 wherein each of the burst buffers comprises:

flash memory; and a flash driver configured to provide the virtual file system component and the metadata server component of the given burst buffer with access to the flash memory;

wherein each of the burst buffers independently manages its flash memory; and wherein the burst buffers are configured such that data consistency is ensured across the flash memories of the respective burst buffers.

10. The apparatus of claim 9 wherein each of the burst buffers further comprises a file system controller coupled to the flash driver.

11. The apparatus of claim 1 wherein multiple files stored in the parallel file system are associated with a single object stored in the virtual file system.

12. The apparatus of claim 1 wherein the compute nodes comprise respective compute nodes of a supercomputer.

13. The apparatus of claim 1 wherein the parallel file system comprises at least one object storage server tier comprising a plurality of object storage servers each having one or more object storage targets.

14. A processing platform comprising the apparatus of claim 1.

15. A method comprising:

configuring a plurality of burst buffers to collectively provide an interface between a parallel file system and a plurality of compute nodes for accelerating input-output (TO) operations directed to the parallel file system, the plurality of burst buffers being implemented external to the parallel file system;

implementing a virtual file system utilizing virtual file system components of respective ones of the burst buffers; and storing metadata relating portions of the virtual file system to portions of the parallel file system in a distributed manner over metadata server components of the respective burst buffers;

the virtual file system component in a given one of the burst buffers comprising a first portion running in a user space of the given burst buffer and a second portion running in a kernel space of the given burst buffer;

the first portion of the virtual file system component in the given burst buffer being configured to process metadata for IO operations received from one or more of the plurality of compute nodes;

the second portion of the virtual file system component in the given burst buffer being configured to provide a data path for accessing a memory of the given burst buffer to perform one or more of the IO operations received from one or more of the plurality of compute nodes; and wherein the given burst buffer further comprises:

a synchronization component running in the user space of the given burst buffer, the synchronization component being configured to copy files between the parallel file system and a local file system of the memory of the given burst buffer, the local file system running in the kernel space of the given burst buffer; and a memory driver running in the kernel space of the given burst buffer, the memory driver being configured to provide the second portion of the virtual file system component and the metadata component of the given burst buffer with access to the memory of the given burst buffer.

16. The method of claim 15 wherein storing metadata comprises storing metadata using a striping mechanism that ensures that a given portion of the metadata is stored on only one of the burst buffers.

17. The method of claim 15 further comprising:

receiving an IO request from one of the compute nodes;

accessing a given one of the burst buffers responsive to the received request to obtain metadata indicating a current hosting burst buffer for corresponding data; and processing the request utilizing the metadata.

18. An article of manufacture comprising a processor-readable storage medium having stored therein program code of one or more software programs, wherein the program code when executed on one or more processing platforms causes the method of claim 15 to be performed.

19. An information processing system comprising:

a computer system comprising a plurality of compute nodes;

a cluster file system coupled to the computer system and comprising:

a parallel file system; and a plurality of burst buffers collectively configured to provide an interface between the parallel file system and the compute nodes for accelerating input-output (TO) operations directed to the parallel file system, the plurality of burst buffers being implemented external to the parallel file system;

wherein each of the burst buffers comprises a virtual file system component and a metadata server component;

wherein the virtual file system components of respective ones of the burst buffers collectively implement a virtual file system;

wherein metadata relating portions of the virtual file system to portions of the parallel file system is stored in a distributed manner over the metadata server components of the respective burst buffers;

the virtual file system component in a given one of the burst buffers comprising a first portion running in a user space of the given burst buffer and a second portion running in a kernel space of the given burst buffer;

the first portion of the virtual file system component in the given burst buffer being configured to process metadata for IO operations received from one or more of the plurality of compute nodes;

the second portion of the virtual file system component in the given burst buffer being configured to provide a data path for accessing a memory of the given burst buffer to perform one or more of the IO operations received from one or more of the plurality of compute nodes; and wherein the given burst buffer further comprises:

a synchronization component running in the user space of the given burst buffer, the synchronization component being configured to copy files between the parallel file system and a local file system of the memory of the given burst buffer, the local file system running in the kernel space of the given burst buffer; and a memory driver running in the kernel space of the given burst buffer, the memory driver being configured to provide the second portion of the virtual file system component and the metadata component of the given burst buffer with access to the memory of the given burst buffer.

20. The system of claim 19 wherein the virtual file system comprises a PLFS and the metadata server components comprise respective IO forwarding servers.

\* \* \* \* \*